United States Patent [19]

Small et al.

[11] 3,920,397

[45] Nov. 18, 1975

[54] APPARATUS AND METHOD FOR QUANTITATIVE ANALYSIS OF IONIC SPECIES BY LIQUID COLUMN CHROMATOGRAPHY

[75] Inventors: Hamish Small, Midland, Mich.; William C. Bauman, Lake Jackson, Tex.

[73] Assignee: The Dow Chemical Company, Midland, Mich.

[22] Filed: Aug. 6, 1973

[21] Appl. No.: 386,260

[52] U.S. Cl. ........... 23/230 R; 23/253 R; 73/61.1 C; 210/25; 210/37; 210/38; 210/284; 210/294
[51] Int. Cl.² ................... G01N 31/04; G01N 27/08
[58] Field of Search .......... 23/230 R, 253 R, 253 A; 210/24, 25, 31 C, 37, 38, 284, 294, 28; 127/9, 46 A; 73/61.1 C

[56] References Cited
UNITED STATES PATENTS

| | | | |
|---|---|---|---|
| 2,422,054 | 6/1947 | Tiger | 210/25 |
| 2,617,766 | 11/1952 | Emmett | 210/25 |
| 2,871,147 | 1/1959 | Smith | 127/46 A |
| 2,938,868 | 5/1960 | Carlson | 210/25 |
| 2,950,176 | 8/1960 | Thayer | 23/230 R |
| 3,382,034 | 5/1968 | Kraus | 210/24 X |
| 3,537,821 | 11/1970 | Hrdina | 23/230 R |
| 3,676,106 | 7/1972 | Hazen | 210/24 X |
| 3,694,369 | 9/1972 | Orlandini | 210/38 X |

OTHER PUBLICATIONS

O. Samuelson, "Ion Exchange Separations in Analytical Chemistry", pp. 186–187, John Wiley, New York, 1963.

*Primary Examiner*—Morris O. Wolk
*Assistant Examiner*—Sidney Marantz
*Attorney, Agent, or Firm*—Edward E. Schilling

[57] ABSTRACT

Apparatus and method for the chromatographic quantitative analysis of a solution containing a plurality of ions. In a particular analysis, the assay is limited to determining either solely the cations or solely the anions. A sample of the solution is added to a first ion exchange bed and eluted therefrom with a solution of developing reagent. The effluent from the first ion exchange bed is passed through a second ion exchange bed where the developing reagent is converted to a weakly ionized form and the ions of interest are paired with a common ion of the opposite sign without destroying the ionic separation produced by the first ion exchange bed. Each separated ionic species of the preselected common sign is quantitatively sensed by a detector, such as a conductivity cell, on exiting from the second ion exchange bed.

58 Claims, 4 Drawing Figures

APPARATUS AND METHOD FOR QUANTITATIVE ANALYSIS OF IONIC SPECIES BY LIQUID COLUMN CHROMATOGRAPHY

CROSS REFERENCE TO RELATED APPLICATIONS

In a copending application of Hamish Small and Timothy S. Stevens filed even date herewith Ser. No. 386,261, there is described a method for quantitative analysis by chromatography of ionic species in solution wherein a separator ion exchange resin bed means is followed by a stripper ion exchange resin bed means and a detector such as a conductivity cell. An eluant solution is used which is capable of moving more tightly bound ions than the alkali metal cations out of the separator bed and the stripper bed is a resin in a form capable of precipitating the eluant within the bed so that eluant is highly ionized form does not reach the detector along with the separated ionic species being analyzed.

In an additional copending application of Timothy S. Stevens filed even date herewith Ser. No. 386,262, there is described a method and apparatus for quantitative analysis by chromatography of ionic species in solution wherein a separator ion exchange resin bed means is followed by two stripper ion exchange resin bed means in series and a detector such as a conductivity cell monitors the effluent from the second stripper bed. The two stripper beds act upon the binary eluant used in the separator bed to transform the eluant stagewise to precipitate one component and then neutralize the other component so that highly ionized forms of said eluant do not reach the detector along with the separated ionic species being analyzed.

BACKGROUND OF THE INVENTION

1. Field of the Invention

The invention relates to apparatus and method for quantitative analysis of a mixture of ionized materials in solution by chromatography utilizing two ion exchange beds sequentially to resolve ions to be analyzed and then to remove or alter the eluant whereby the resolved ion species can be sequentially detected and quantitatively analyzed utilizing a single common detector.

2. Description of the Prior Art

There is a constant and ever increasing demand for analysis of ionic species in aqueous solution or other highly polar medium, particularly for inorganic species. This demand has become more prominent of late with the emphasis on water monitoring in connection with pollution control. Chromatographic methods of analysis have a particular appeal, especially from the point of view of automated monitoring, but no chromatographic technique has been developed heretofore for inorganic species that enjoys the same widespread use as does vapor phase chromatography for organic species. Moreover, this situation has prevailed despite the well-known ability of ion exchange resins to separate ionic species whether they can cationic or anionic in nature. The probable reason for this appears to be as follows. At least two very necessary prerequisites determine the utility of a chromatographic method: (1) separation of the ionic species by some means in the chromatographic column so that they appear at different times in the effluent, i.e., the species are resolved; (2) a convenient means of continuously and accurately analyzing for the species in the effluent, the means being universally applicable for every species contemplated.

The first prerequisite is quite well satisfied by the known ion exchange resins. For instance, it is a simple matter to obtain excellent separations of complex mixtures of cations or anions merely by eluting them through an ion exchange bed with an appropriate electrolyte serving as eluant or developing reagent.

The problem, however, is the inability, except in quite special cases, to satisfy the second prerequisite. As a rule, it simply is not possible to distinguish the ions eluting from the column from the more concentrated background consisting of developing reagent used to develop the chromatogram. In some instances it has been possible to use spectrophotometric detectors to distinguish a wide variety of ions, mainly organic ions. However, in the case of many ions, particularly the inorganic ions such as the ions of lithium, sodium, potassium, calcium, chlorine, bromine, iodine, and, the ammonium, nitrate, nitrite, sulfate and phosphate ions, spectrophotometric methods have not been widely employed.

The use of two ion exchange resin beds in series for the demineralization of water is well-known. Typically, the first bed removes cations and the second bed removes anions to achieve a grade of water sometimes approaching the quality of distilled water as to mineral content and conductivity. In such demineralization operations, the mineral ions, both cations and the paired anions, are captured and held until the respective resin beds are loaded enough so that a substantial proportion of ions "break through" the ion exchange beds whereupon they are detected by a conductivity meter or by a "hardness" test. At this stage operations are either stopped or switched to an alternate set of beds and both ion exchange resin beds are subjected to respective separate backwashing and regeneration procedures wherein the cation exchange resin bed is soaked in strong mineral acid while the anion exchange resin bed is soaked in strong base, and each thoroughly rinsed with tap water whereupon the demineralizing equipment is ready for further service. During the demineralizing operations there is no elution with an eluant, or developing reagent, there is no development of a chromatographic separation, and no analysis, much less quantitative analysis of separated ionic species.

SUMMARY OF THE INVENTION

It has now been discovered that chromatographic quantitative analysis of a plurality of ionic species in solution, the ionic species being either all positive or all negative ions, is readily carried out utilizing first ion exchange resin bed means for chromatographically separating said plurality of ionic species on being added to and eluted from such resin bed with solution of developing reagent; second ion exchange resin bed means for receiving the separated ion species in the solution of developing reagent and converting all of said developing reagent to weakly ionized form while substantially maintaining the ion species separated as said solution passes through and out of said resin bed; and a common means for quantitatively detecting each separated ion species exiting from said second ion exchange resin bed means.

Both of the resin bed means may be contained in a single generally cylindrical column or in respective separate columns connected in series, or, each ion exchange resin bed means per se may be a plurality of columns used alternatively. However, it is essential that the first resin bed means is connected in series to the second resin bed means and the latter discharges effluent to the detector. Preferably the first resin bed means is charged with a low capacity ion exchange resin capable of good resolution of the ions of interest while the second resin bed is charged with an ion exchange resin capable of stripping out the developing reagent or converting it to weakly ionized form so that the detector can detect the ions of interest relatively free of background.

In carrying out the present method, a solution containing a plurality of ionic species of like sign to be analyzed quantitatively by chromatography is added to preselected first ion exchange resin bed means containing an ion exchange resin capable of separating the ionic species and eluted therefrom with a solution of a preselected developing reagent or eluant capable of, together with the first ion exchange resin bed means, cooperatively facilitating chromatographic separation of the ionic species; the effluent from the first ion exchange resin bed means is then passed through a second ion exchange resin bed means containing an ion exchange resin of a preselected nature, geometric configuration and amount to effectively convert all of the developing reagent to weakly ionized form substantially without destroying the said chromatographic separation; and finally the effluent from the second ion exchange resin means substantially free of developing reagent in highly ionized form is passed through a detector capable of quantitatively measuring the separated ionic species passing therethrough, e.g., by measuring conductivity or other suitable physical property of the effluent.

In its simplest form the present apparatus comprises a single chromatographic column chargeable with upper and lower ion exchange resin beds with some form of separator, e.g., a perforated distributor plate generally at about mid-height, a valvecontrolled port adjacent the distributor plate, to permit backwashing the lower bed without greatly disturbing the upper bed, and a conductivity cell piped to receive effluent from the column and electrically connected to readout means for measuring electrical signal from the cell and converting such electrical signal to a visible signal.

Most usually, the present apparatus comprises first and second chromatographic columns of approximately equal dimensions connected in series by a liquid conduit, a common detector adapted to detect quantitatively the members of said ionic species on being eluted in solution from said second chromatographic column and fed to said detector, a readout means electrically connected to and adapted to receive the electrical signal from said detector and to convert said electrical signal to a visible signal, and liquid conduit means for conveying each of said solution of ionic species and solution of developing reagent to said first chromatographic column, effluent from such first column to the second column and effluent from the second column to the detector. Preferably, the readout means includes a recorder-integrator.

FURTHER DESCRIPTION OF THE INVENTION

The present method and apparatus are well adapted for the rapid and automated analysis of a great variety of ionic species whether cationic or anionic. The ionic species determined in any given analysis must be either entirely cations or entirely anions. Examples of types of samples amenable to the present method include surface waters, industrial chemical waste streams, blood serum, urine and fruit juices. Covalent molecular compounds, such as amines, are often convertible to ionic form as by making acid salts or quaternary ammonium compounds and thus analyzable by the present method and apparatus.

While analysis is ordinarily carried out in aqueous medium, the procedure may also be carried out in non-aqueous solvents providing the solvents are highly polar. Examples of suitable non-aqueous media include the lower alcohols having from 1 to 4 carbon atoms and glacial acetic acid.

Figures 1, 2, 3:
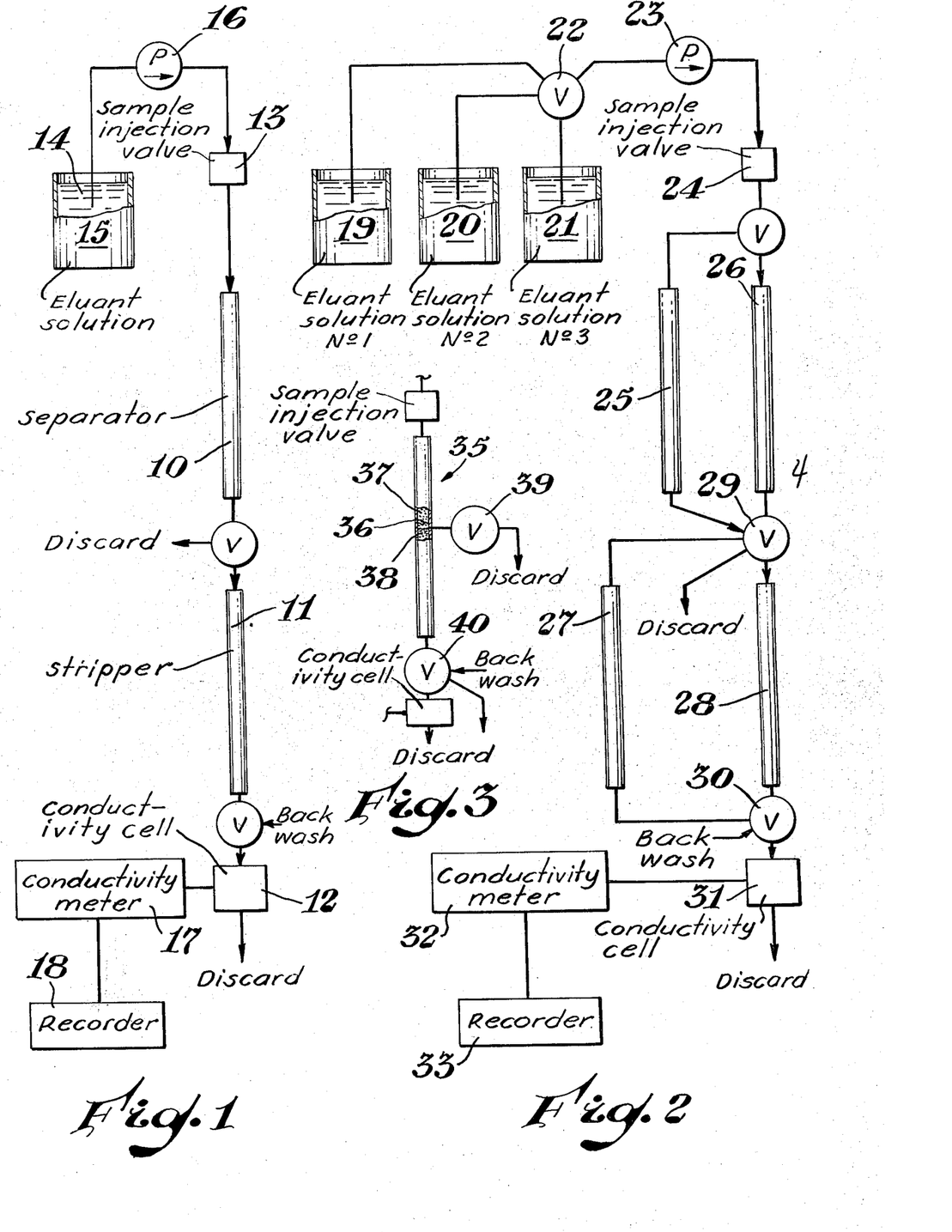
FIG. 1 is a schematic representation of an embodiment of the apparatus of the invention showing, in series, a reservoir of eluant solution, a pump, a special injection valve, or other sample injection device, the first column, on which the ionic species are resolved, the second column, in which the eluant is converted to substantially non-ionized molecular form, or retained by ion exchange action, and, as the detector, a conductivity cell, the conductivity cell being electrically connected to a conductivity meter which feeds a signal to a readout means such as a recorder.
FIG. 2 is a schematic representation of another embodiment of apparatus according to the invention in which there are employed a plurality of eluant solution reservoirs and a plurality of columns both for the resolution of ionic species and for the prevention of eluant in ionic form from reaching the conductivity cell.
FIG. 3 is a mainly schematic fragmentary view partially broken away and in section of another embodiment of the present apparatus utilizing a single chromatographic column to house the two resin beds used according to the present invention.

Referring now to FIG. 1 of the drawings the apparatus of the present invention is seen basically to consist of a first chromatographic column 10 arranged in series with a second chromatographic column 11 followed by a conductivity cell 12. Sample may be placed on column 10 in most any suitable manner but preferably by means of a syringe (not shown) is added to the system at sample injection valve 13. The sample injected at valve 13 is swept through the apparatus by solution of developing reagent, i.e., eluant solution 14 drawn from eluant reservoir 15 by pump 16 and passed through the sample injection valve 13 to the first chromatographic column 10. Likewise the eluant solution may be added to the first column manually as by pouring the solution from a vessel into an open column, but is preferably added in a continuous stream to obtain better uniformity and reproducibility in results. The solution leaving chromatographic column 10 with the ionic species resolved is conveyed by a liquid conduit to chromatographic column 11, that is, the second chromatographic column wherein the eluant either is retained at ion exchange sites or converted to weakly or substantially non-ionized molecular form. The solution with resolved species therein then passes on from the chromatographic column 11 through liquid conduit means to the conductivity cell 12. In the conductivity cell 12, the fluctuations in ionic concentration produce an electrical signal proportional to the amount of ionic material and which is directed to the conductivity meter 17. The electrical signal of the conductivity meter 17 is, in turn, directed to the recorder 18 which provides a visible signal. The conductivity meter 17 and the recorder 18 together constitute readout means for the signal from the conductivity cell 12.

Referring now to FIG. 2, there is seen another embodiment of the apparatus of the invention in which there are provided a plurality of eluant solution reservoirs 19, 20 and 21. By means of a multiport valve 22, or any other equivalent valving arrangement, control is had over the eluant solution selected for withdrawal by pump 23 and direction through a liquid conduit to sample injection valve 24 and thence to either of columns 25, 26, which serve as alternate first or separator columns. Effluent from either of the separator columns 25, 26, is directed to either of a plurality of stripper columns 27, 28, control being had by means of a valve such as three-way valve 29. Valve 29 will be a multiport valve if more than two columns are used. Effluent from whichever stripper column 27 or 28 is in use is directed by the three-way valve 30 to the conductivity cell 31 and thence to discard. The electrical signal from the conductivity cell 31 is directed to the conductivity meter 32 and the output of the meter is directed to the recorder 33.

In a highly simplified form of the present apparatus shown in the fragmentary schematic view in FIG. 3, the ion exchange resin beds are both housed in a simple column indicated generally by the numeral 35 with a distributor plate or device 36 such as a screen or perforated plate separating the upper, separator, ion exchange resin bed 37 and the lower, stripper, ion exchange resin bed 38. To facilitate backwashing and regeneration of the stripper bed 38 the column 35 is provided with an outlet port adjacent the distributor plate 36, the port being controlled by the valve 39. Backwashing and regeneration solution or liquid is admitted to the system through the multi-port valve 40 below the column.

It must be understood that the columns shown in the drawings are ordinarily small diameter tubing, usually of glass or stainless steel, the small diameter, together with fast flow rates of solution of developing reagent facilitating analysis times of generally less than about 20 minutes for a plurality of ionic species, though much longer times are sometimes needed. For the purposes of the present discussion and the appended claims, small diameter columns are those having an internal diameter (I.D.) of not more than about 3 millimeters. Larger diameter columns may be used if desired, but with columns of about 9 millimeters I.D., e.g., analysis times of 150 minutes or more are not unusual.

In carrying out the present method, the sample size employed is preferably very small in order to facilitate rapid, sharp separations and determinations and especially to avoid overloading the low capacity separator column used so that it is not necessary to employ large volumes of solution of developing reagent for the chromatographic separation in such first, i.e., separator, resin bed. Thus, the ion exchange capacity required in the second resin bed is kept in manageable proportions. A syringe is conveniently used to inject a portion of sample solution into a sample injection valve which measures out, e.g., from about 0.002 to about 5 milliliters of a dilute solution containing a plurality of ionic species, which in total are present in an amount, expressed in milliequivalents, not greater than about 1 to 10% of the ion exchange capacity of the separator bed.

The use of a syringe and a sample injection valve with a plurality of measuring loops of various sizes corresponds to conventional practice for introducing sample to a chromatographic column. Other means of sample introduction may be employed, if desired, such as pipetting sample into the top of an open column. However, gravity flow operations tend to be less easily controlled.

It is therefore much preferred to use a pump and to supply a substantially continuous stream of solution of developing reagent, or eluant solution, according to good current chromatographic practice in which the eluant solution is used to sweep the sample out of the sampling valve and onto the column. Typical flow rates fall, generally, in the range of about 20 to 1000 milliliters/hour of solution of developing reagent when a column is larger than about 3 millimeters, internal diameter, is used.

The sample may be analyzed, in any given run, for those ionic species of a common valence sign, i.e., positive, or, negative, since any given ion exchange resin, with the exception of the amphoteric resins which are not useful here will hold either cations only or anions only. The ion exchange resin is selected accordingly and with a view to the developing reagent to be used therewith to achieve good separation. While any given separation may be achieve, usually, with any of several different resins, the generally used resins commercially available each require the use of a quantity of eluant solution sufficient to rather rapidly exhaust the resin used herein in the second bed to strip out the developing reagent. Thus, it is much preferred as a practical matter and especially for purposes of regular repetitive analyses that the first, i.e., the separator, resin bed be of a resin with special characteristics. This special resin is one with high performance characteristics in its ability to separate ionic species, but at the same time is a resin of low specific capacity so that only a small amount of developing reagent is needed to accomplish separation and elution off the resin bed. For the present purposes, it is preferred that the specific exchange capacity is in the range of about 0.005 to 0.1 milliequivalents per gram (m.eq./g.) of resin. For high performance characteristics it is essential that highly active ion exchange sites are disposed on and in a surface layer of the resin beads or particles and that such sites be readily and promptly available to ionic species in solution flowing over the resin bead surfaces. In a highly cross-linked gel form ion exchange resin, the exchange process will not be as prompt and efficient as desired. Therefore, the preferred separator resin is pellicular in nature in having the active sites at or very close to the surfaces of the resin beads. Somewhat less preferred but superior to the gel particle resins are the more highly cross-linked ion exchange resins which are porous in nature having active sites along the walls of the pores but the pores providing far more accessibility to the ionic species than is found in the gel type resins. The high performance resins facilitate obtention of the sharpest peaks and best resolution of the ionic species although the other resins may be of advantage in a situation wherein two ionic species tend to elute simultaneously from the high performance resin.

The preferred ion exchange resin for cation separations in a surface sulfonated copolymer of styrene and divinyl benzene having about 2–4 percent by weight divinyl benzene in the copolymer and the balance substantially styrene. The beads are preferably of an average particle size in the range of about 200 to about 400 mesh (U.S. Sieve Series) although finer sizes may be used if desired. In general a coarser grade permits faster flow rates at a given applied pressure from the pump while finer grades afford greater exchange capacity per gram for a given degree of sulfonation. Surface sulfonation is accomplished rather simply by briefly heating the copolymer beads in hot (e.g., 8°–110°C.) concentrated sulfuric acid for a short time, for example, about 15 minutes, or until the desired specific exchange capacity is achieved but not exceeded. A specific exchange capacity of about 0.02 m.eq./g of resin is sufficient to achieve good separations and is low enough to afford much use of a regular resin in the stripper bed. In contrast, a conventional cation exchange resin not sulfonated as above has a specific exchange capacity of about 5 to 10 m.eq./g. of resin.

In carrying out anion analysis the separator bed will be constituted of an anion exchange resin. Again, a conventional resin capable of separating the ionic species of interest may be employed in a rather small quantity relative to the stripper bed, but it is much preferred to use a specially selected or prepared resin with high performance, low specific exchange capacity characteristics.

The term high performance as used herein means that the ionic species are cleanly and sharply separated so that the readout means shows sharp concentration peaks and good baseline separation between all or most of the peaks. This necessarily implies that the ionic species do not penetrate deeply into the resin structure or are otherwise not held up during development of the chromatographic separation, else the peaks would not be sharp and well separated.

A preferred form of anion separator resin is a surface sulfonated styrene-divinylbenzene copolymer as described above coated with fine particles of a strong base anion exchanger resin. Such a separator resin having the requisite surface coating is prepared by thoroughly grinding a strong base anion exchange resin in a rod mill and selecting a fraction thereof having particle sizes in the range of about 0.1 to about 2 microns, as measured when dry. Then some of the surfaces sulfonated styrene-divinyl benzene copolymer, with an average particle size in the range of about 200 to 400 mesh is placed in a column and a dilute suspension of the ground resin is added to the column until ground particles start coming through with the effluent. The column is then washed with additional eluant liquid, usually water, and is ready for use, the surface sulfonated resin having acquired a substantial surface adherent coating of the ground resin particles.

A suitable anion exchange separator resin is prepared also by heating vinylbenzyl chloride latex with ethylene diamine to achieve cross-linking and then treating that material with either triethylamine or dimethylethanolamine to obtain an anion exchange material which is added to the surface of particles of surface sulfonated styrene-divinyl benzene copolymer as described above.

The ion exchange resin used in the stripper column is preferably a high capacity resin so that it can handle relatively large volumes of solution of developing reagent without allowing the same to reach the conductivity cell in highly ionized form. Highly ionized form, as used herein, is intended to means a form of the developing reagent which is dissociated into ions with a dissociation constant $K_{dissoc.}$ greater than about $1.0 \times 10^{-6}$. Weakly ionized or dissociated species, i.e., less highly ionized forms, with a $K_{dissoc.}$ no greater than about $1 \times 10^{-6}$ are barely, if at all, detected by the conductivity cell and do not significantly alter or interfere with the quantitative detection of substantially completely dissociated ionic species.

The stripper resin is, in each case, selected coordinately with the developing reagent so that the developing reagent is converted in or by the stripper resin to a form that is not highly ionized, i.e., is weakly ionized.

Figure 4:
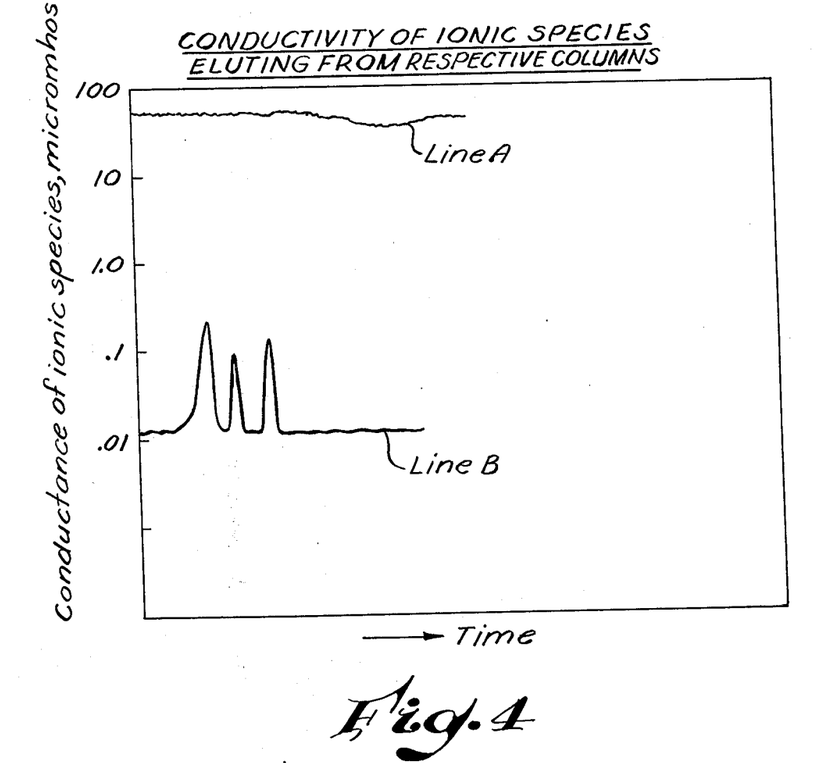
FIG. 4 is a bilinear graph of conductivity of ionic species on a log scale versus time showing typical patterns of conductivity of such ionic species upon being eluted (1) from a single conventional chromatographic column wherein the eluant provides a very large amount of ionic material and the resolved ionic species raise the concentration of total ionic material so slightly by comparison as to show up as little peaks lost in the instrument noise when the instrument is set to receive and record the large continuous background, and (2) from the second ion exchange resin bed of the present invention whereby background ionic species are substantially absent.

The action and the significance of the stripper bed will be better understood with reference to FIG. 4 of the drawing. The effluent from the separator bed, in a typical separation of three ionic species according to the invention, would show a readout corresponding to the upper line designated A on the graph in which time is represented along the abscissa and conductivity of ionic species along the ordinate. The conductance readings are all very high because of the presence of the developing reagent or eluant and the peaks for the small amount of ionic species of interest that have been chromatographically separated are lost in the instrument noise and, accordingly, are barely detectible, if at all.

Upon passing the effluent from the separator bed through the stripper bed, the developing reagent is converted to a weakly ionized or poorly dissociated form that substantially does not register on the conductivity cell. As a consequence the readout from the conductivity cell for the sort of ionic species separation described would, typically, appear something like line B on the graph of FIG. 4. Line B reflects a very low total ion concentration compared to Line A, and further, the peaks are highly visible and accurately measurable. Line B represents the type of results obtainable according to the present method and in sharp contrast to the picture presented by Line A, Line A representing effluent generally obtainable according to the prior art.

For most analyses, it is preferred to use about the same bed volume and geometry for each ion exchange resin bed in order to avoid problems in smearing out or disturbing, in the stripper bed, the separation obtained in the separator bed. However, this may be varied to accommodate various needs. Thus, the separator bed may be larger than the stripper bed if necessary to achieve separation of difficulty resolveable ion combinations. On the other hand if resolution is easily achieved, repetitive analysis may be carried out more rapidly if the separator bed is relatively small, typically as to its depth.

The relationships shown according to the following equation are used to select the resins and amounts thereof to achieve predetermined results:

In the case of a cation determination $$V_B = \frac{V_A C_A K_{E^+}{}^{M+} N}{C_B}$$

where
- $V_b$ = volume in milliliters of stripper bed resin
- $V_A$ = volume in milliliters of separator bed resin
- $C_A$ = specific exchange capacity in m.eq./g. of the separator resin.
- $C_B$ = specific exchange capacity (m.eq./g.) of the stripper resin.
- $K_{E+}^{M+}$ = selectivity coefficient, relative to the eluant ion E+ of the ion M+, which in the series to be analyzed has the greatest affinity for the separating resin.
- $N$ = number of samples that can be analyzed before exhausting the stripper bed.

In the case of anion analysis the selectivity coefficient is $K_{E-}^{A-}$ where A— is the most tightly held anion to be analyzed and E— is the eluant ion.

To obtain a high chromatographic efficiency it is necessary to keep $V_B/V_A$ as low as possible. A value close to unity is excellent, but a value less than about 10 is acceptable. In order that N be as large as reasonably possible, i.e., that a large number of samples may be injected before the stripper resin is exhausted, it is necessary that the quantity $C_A K_{E+}^{M+}/C_B$, or, $C_A K_{E-}^{A-}/C_B$, be kept, within certain limits, as small as possible wherein K is the selectivity coefficient for the mostly tightly bound ion being determined, whether anion or cation. This can be done by:

1. Maintaining $C_A$ as large as possible by using conventional ion exchange resins of a high degree of cross-linking.

2. Maintaining $C_B$ as small as possible. This is achieved by using specially prepared resins of very low specific capacity. However, a lower limit on the capacity of the separating resin is set by the need to avoid overloading of the column by the sample injected, keeping in mind that the sample must be large enough for the ionic species of interest to be detectable. Generally, at least 25–35 nanograms of a given ion species is required for quantitative detection by a conductivity cell, the response varying with the nature of the ionic species, requiring calibration for each conductivity cell and readout combination. In some instances as little as three nanograms of an ionic species have been quantitatively detected.

The ion exchange resins usable in the stripper column, i.e., the second bed, are, typically polystyrene or modified polystyrene copolymers cross-linked, e.g., with divinyl benzene, and carrying nuclear groups, the latter providing the active exchange sites. The strong cation exchange resins carry nuclear sulfonic acid or sulfonate groups along the polymer chain, while the weak cation exchange resins usually carry carboxylate groups. The strong base anion exchange resins carry nuclear chloromethyl groups which have been quaternized. The weak base exchange resins carry nuclear primary, secondary or tertiary amine groups.

For further information on ion exchange theory, processes and resin synthesis reference is made to the monograph "Dowex: Ion Exchange" 3rd Ed., 1964, published by The Dow Chemical Company, Midland, Mich. and the two volume work "Ion Exchange" edited by Jacob A. Marinsky and published by Marcel Dekker Inc., New York 1966. Chapter 6, Vol. 2, of "Ion Exchange" is devoted to a description of synthesis of ion exchange resins of various types usable herein in the stripper resin bed.

It is to be understood that the separator beds are not used to collect ionic species, but to develop a chromatographic separation on elution, and thus the separator bed resins do not require regeneration. On the other hand, the stripper columns do effect true anion exchange and must be used in a predetermined form, e.g., acid, or, base, or other form in order to collect the ionic portion of the developing reagent which would otherwise pass on to the detector in highly ionized form.

It is to be understood that reference herein to the use of a stripper bed or column is meant to include the use of the requisite amount of stripper bed resin whether utilized as a single bed, or a plurality of beds or columns containing a given resin in a given form.

The ionic species reaching the detector in detectable ionic form do not elicit equally great responses per equivalent weight of ion, i.e., the conductance of 0.01 molar NaOH solution is not the same as the conductance of 0.01 molar KOH solution. Therefore, the instrumental response of the present instrument must be calibrated using known concentrations of known substances in order to carry out accurate quantitative analyses.

The detector used may be a polarographic cell, a differential refractometer, a specific ion electrode, or a spectrophotometer, since each of these is capable of use as a common detector, i.e., a detector capable of detecting and quantifying each ionic species of interest in a given determination, rather than having to resort to various analytical instruments or detectors. The preferred derector is the conductivity cell because of its sensitivity.

In carrying out analysis of a plurality of ionic species according to the present percent solution of the ionic species is filtered, if particulate material is present, the pH is adjusted if necessary to ensure solubility, or, to protonate the compounds of interest, e.g., in the case of organic amines, and the sample is diluted or concentrated in order to obtain a suitable working, detectable quantity of ionic species. The total amount of ionic species of all kinds in the sample in a manageable amount of solution for injection onto the first column should be, as expressed in number of equivalents, in the range of about 1 to 10 per cent of the ion exchange capacity of the first ion exchange resin bed, or may be less if sensitivity of the detector permits.

In the present commercially available sample injection valves, a given valve plug bore or a loop of tubing connected to two of the valve body parts determines sample size which is swept out by the eluant solution as well understood in the art. Manageable amounts of solution handled by such valve vary from about 0.002 to about 5 milliliters.

In the case of organic amine samples initial preparation includes either simple hydrohalide salt preparation as by acidification in aqueous medium, or if desired, may include preparation of quaternary ammonium halide compounds which are then dissolved in water and provide the amine compounds in the requisite ionic form to facilitate analysis according to the present method.

The solution of developing reagent selected must be capable of moving the most tightly bound species present, and of interest, off the separator resin bed. To that end it is preferred that the developing reagent has an affinity for the ion exchange resin in the first resin bed in the range of about 0.1 to 10 times the affinity of the most tightly bound ion to be moved off the column. The concentration of developing reagent is generally in the range of about 0.005 to about 0.05 normal, the more concentrated solution being usable to move the more tightly bound ions off the resin.

The sample in the injection valve is swept out, preferably by a steady stream of eluant, to the first ion exchange resin bed where chromatographic separation of the various ionic species takes place as elution is continued. The eluant solution generally flows through piping or conduit means to the stripper column where an appropriate ion exchange resin is used to prevent the developing reagent from leaving the column as highly ionized material. From time to time as the ion exchange resin in the second column becomes "spent" or exhausted, it is necessary to backwash and regenerate the resin to the form desired.

To avoid undue exhaustion of the stripper resin bed during an extended elution between emerging ion species peaks in the case where successive ion types come off the separator column at widely spaced times, it is generally desirable to run the effluent from the first column to waste or discard, providing there is some assurance no other intervening species are present. The liquid flow is then switched back to the second column as the time approaches for the next ionic species to emerge.

Wherein numerous routine analyses are to be carried out, it is generally advantageous to have two or more stripper columns connected in parallel and valved to be used alternately. Thus, one can be backwashed, if necessary, and regenerated, while the other is in use, so that there are minimal delays in the analytical process.

The well recognized synthetic ion exchange resin usable herein are all cross-linked to organic polymers and copolymers carrying cationic, or anionic functional groups along the polymer chain. The cation exchange resins are most usually a polystyrene polymer or copolymer carrying nuclear functional groups such as sulfonate or carboxylate groups. The anion exchange resins may also be polystyrene carrying nuclear amine groups which have been quaternized. Other anion exchange resins are polyalkylenepolyamine condensates. Most any of the known ion exchange resins may be used in the separator column providing allowance is made for the requisite exchange capacity relationship between the separator and stripper beds. As indicated hereinabove, it is much preferred to use a high performance, low capacity ion exchange resin in the separator column.

The least interference with the ion species separation obtained in the separator bed is to be expected if the second column has the same geometry, i.e., radius and length as the first column. However, any size and shape of stripper bed may be used that substantially does not destroy the separation obtained in the separator bed.

The term developing reagent is intended to mean the substance in solution, rather than the solution per se, which moves the ionic species to be determined through and off the separator resin bed. It is thus apparent that the developing reagent must have a fair degree of affinity for the ion exchange sites on the separator resin in order to displace the ionic species to be determined. The solution of developing reagent is sometimes referred to herein as eluant solution.

Extremely tightly bound ionic species not being determined may occasionally find their way onto the separator resin. These can be removed, if found to be affecting the capacity of the separator bed, by flushing the same with a developing reagent capable of displacing such ionic species.

In carrying out specific types of separations it is found that the alkali metals are conveniently separated using hydrochloric acid as eluant solution. The anions of nearly every type are conveniently and effectively separated using a phenate salt solution, e.g., sodium phenate solution, or a mixture of phenate salt and sodium hydroxide. A number of amine derived cations are also suitably separated using pyridine hydrochloride or aniline hydrochloride as developing reagents.

In general, the more dilute solutions used and the greater provisions for more complete resolution of the ionic species, the longer times are required to complete analysis of a sample since basically, about the same number of equivalents of sample ionic species and of developing reagent are going to be used for a given analysis on a given instrument. These factors will be balanced to achieve practicality of time permitted and results required.

EXAMPLES

The following examples serve to illustrate the use of the method and apparatus of the invention and the scope of the invention is not intended to be limited thereto.

EXAMPLE 1

A 9 millimeter (mm) I.D. column was charged with two layers or beds of ion exchange (I.E.) resin. The bottom bed was 13 inches deep and consisted of 200–400 mesh (U.S. Sieve Series) Dowex 1 × 8 I.E. resin in the hydroxide form and had an anion exchange capacity of about 21 m.eqs. Dowex 1 × 8 I.E. resin is a strong base anion exchanger being mainly polystyrene with trimethyl benzyl ammonium groups on the polymer chain.

The top layer or bed was also about 13 inches deep and consisted of a surface sulfonated styrene divinyl benzene copolymer of very low capacity, i.e., about 0.0225 m.eqs./g. so that the total capacity of this layer was only about 0.23 m.eq.

To the inlet of the column was attached a sample injection valve fed by a pump which in turn was supplied by an eluant solution reservoir. The outlet of the column was connected to a conductivity cell. The cell was connected electrically to a conductivity meter and recorder combination.

An aqueous sample of known concentration was made up to be 0.01 normal (N) in each LiCl, NaCl and KCl. A sample portion of 0.1 milliliters (ml) size was injected onto the column using the sample injection valve and chromatographic separation developed using 0.02 N aqueous hydrochloric acid. The recorder tracing showed that the Li, Na and K ions were completely separated and eluted and detected in about 130 minutes and that the peak heights indicated the known ion concentrations as determined by previous runs with known standard solutions of each metal ion.

EXAMPLE 2

A 2.8 × 300 mm glass column was filled with a surface sulfonated styrene divinyl benzene copolymer (0.036 m.eq./g.) and treated with an aqueous suspension of finely ground Dowex 2 × 8 I.E. resin in the chloride form, the ground resin having particle sizes mainly in the range of about 0.1 to 2 microns major dimension as measured when dry. The treatment consisted of adding suspension to the column until ground resin started to exit the column when the column was rinsed further with distilled water until particulate resin substantially stopped exiting the column. This separating column was coupled to a 9 × 250 mm stripper column and was provided with a sample injection valve, pump and eluant reservoir, while the effluent of the stripper column was directed to a conductivity cell and readout means, all substantially following the scheme of FIG. 1 of the drawings. The stripper column was substantially filled with Dowex 50 WX 16 I.E. resin in the hydrogen ion form having mean particle diameters of about 25 microns. A 10 microliter sample of an aqueous solution containing 258 parts per million (ppm) chloride ion and 1847 ppm sulfate ion was injected onto the column using the sample injection valve and elution was carried out with 0.05 N aqueous sodium hydroxide solution. The chloride ion was sharply separated and eluted after about 17 minutes, the sulfate being retained to later than 34 minutes.

On replacing the 0.05 N NaOH eluant with an aqueous solution 0.045 formal (F) in NaOH and 0.005F in sodium phenate (made up by employing 0.05 moles per liter NaOH and 0.005 moles per liter phenol) and conditioning the column to this eluant solution, excellent base line separations of rather symmetrical peaks of chloride and sulfate were obtained in less than 25 minutes after injection, the two peaks appearing about 10 minutes apart. The eluant solution flow rate was about 32 ml per hour.

On carrying out further separations of various combinations of ions per sample on the same column using the same sodium hydroxide-phenate eluant solution or a solution 0.035 F in NaOH and 0.015 F in phenate, excellent separations were obtained of the following anions: fluoride, chloride, bromide, iodide, iodate, nitrate, nitrite, sulfite, sulfate, orthophosphate, formate, acetate, monochloroacetate, trichloracetate and oxalate.

On replacing the stripper column with a 2.8 × 300 mm column charged with 200–400 mesh Dowex 50 WX 8 I.E. resin in the hydrogen ion form and on using variously, 0.005 F, 0.01 F, and 0.015 F sodium phenate solution as eluant solution, excellent separations were obtained of various graphs of the anions above listed plus bromate, carbonate, chromate, propionate, dichloracetate, glycolate, maleate, fumarate, succinate, malonate, itaconate, benzoate, ascorbate and citrate ions.

EXAMPLE 3

In apparatus of the type shown schematically in FIG. 1 of the drawings, the first or separator column was a 9 × 250 mm glass column filled with surface sulfonated styrene-divinyl benzene copolymer I.E. resin having an ion exchange capacity of 0.024 m.eq./g. and the second or stripper column was a 9 × 250 mm glass column filled with 200–400 mesh Dowex 1 × 8 I.E. resin in the hydroxide form. A 0.1 ml quantity of an aqueous solution of a mixture of ethyl amines was injected onto the first column and elution was carried out using 460 ml./hr. flow of an aqueous eluant solution 0.001 molar (M) in aniline hydrochloride and 0.001 M in HCl, the excess HCl being used to protonate the amines. Good separation of monoethylamine, (14 ppm); diethylamine (20 ppm) and triethylamine (40 ppm) was obtained, though there was slight indication of over-loading with respect to the monoethylamine when the analysis was repeated with a sample containing 10 times as great a concentration of each said amine.

EXAMPLE 4

As an example of the stripping of the developing reagent by attraction to ion exchange sites, respective aqueous solutions of two or more alkaline earth metal salts were injected onto a column forming a part of apparatus according to FIG. 1 of the drawings, the column containing surface sulfonated styrene-divinyl benzene copolymer resin of low specific capacity. The metal ions were eluted with a dilute aqueous solution of cupric nitrate in order to move such more tightly bound ions off the separator column. The second column was charged with a polyamine type ion exchange resin consisting basically of polystyrene polymer having some of each of trimethylbenzyl ammonium and diethylenetriaminebenzyl ammonium groups in the polymer chain. On such stripper column, the copper nitrate developing reagent was substantially all complexed and prevented from reaching the detector. Using such column combinations the alkaline earth metal ions were readily separated and quantified. The stripper column did not exhibit an especially great exchange capacity so as to accommodate a large number of determinations without regeneration, but was regenerated by passing through it an aqueous solution of a polyamine such as ethylene diamine or diethylenetriamine. Ammonium hydroxide may be used for regeneration, if desired.

Rather extensive analyses of a large variety of ions of known concentration using the present method and apparatus has shown that nearly all ionic species produce a substantially linear response in a conductivity cell with respect to ion concentration over a wide concentration range.

By appropriate selection of sample concentration, ion exchange resins, eluant solution type and concentration and flow rates and column geometry so as to achieve elution of sharply defined peaks of concentration of a given ionic species and upon increasing recorder sensitivity, the limits of detectability and quantification of many ionic species, using the present method and apparatus is in the parts per billion range of nanogram quantities of ionic material.

We claim:
1. Apparatus for chromatographic quantitative analysis of a plurality of ionic species in a solution, each species being of a common valence sign, said sign being one of positive or negative, which comprises:
 first ion exchange resin bed means for chromatographically separating said plurality of ionic species on being added to and eluted from such resin bed with solution of developing reagent;
 means for adding said plurality of ionic species in solution to the first ion exchange resin bed means;
 means for adding solution of developing reagent to the first ion exchange resin bed means;
 second ion exchange resin bed means for receiving the separated ion species in the solution of developing reagent and converting all of said developing reagent to weakly ionized form while maintaining the ion species separated as said solution passes through and out of said second resin bed;

and a common means for quantitatively detecting each separated ion species of interest exiting from said second ion exchange resin bed means.

2. The apparatus as in claim 1 in which the ion exchange resin utilized in the first ion exchange resin bed means has a specific ion exchange capacity in the range of about 0.005 to 0.1 milliequivalents per gram of resin, the resin being particulate and having the exchange sites thereof readily and promptly accessible to ionic species in solution flowing over the particle surfaces.

3. The apparatus as in claim 1 in which the means for quantitatively detecting separated ion species is a conductivity cell and readout means therefor.

4. Apparatus for chromatographic quantitative analysis of a plurality of ionic species in a solution, each of a common valence sign, said sign being one of positive or negative, which comprises:
preselected first and second ion exchange resin beds disposed so as to receive said solution of ionic species sequentially;
means for adding said plurality of ionic species in solution to the first ion exchange resin bed means;
means for adding solution of developing reagent to the first ion exchange resin bed means;
a conductivity cell adapted to detect and react quantitatively to the said ionic species on their being eluted in solution from said second ion exchange resin bed and fed to said conductivity cell, said reaction of the conductivity cell being an electrical signal;
a readout means electrically connected to and adapted to receive the electrical signal from said conductivity cell and to convert said electrical signal to a visible signal;
and liquid conduit means for conveying said solution of ionic species from said second ion exchange resin bed to said conductivity cell;
said first ion exchange resin bed being preselected to chromatographically separate said members of ionic species in said solution on being eluted therefrom and said second ion exchange resin bed being preselected to prevent the developing reagent from reaching the conductivity cell in highly ionized form;
said second ion exchange resin bed having an ion exchange capacity sufficient to accommodate the developing reagent necessary to achieve separation of ionic species on said first ion exchange resin bed.

5. Apparatus as in claim 4 wherein the ion exchange capacity of the second ion exchange resin bed is at least 5 times the capacity of the first ion exchange resin bed.

6. Apparatus as in claim 4 wherein the ion exchange capacity of the second ion exchange resin bed is at least 200 times the capacity of the first ion exchange resin bed.

7. The apparatus as in claim 4 wherein the first ion exchange resin bed is made up of a cation exchange resin and the second ion exchange resin bed is made up of an anion exchange resin.

8. The apparatus as in claim 4 wherein the first ion exchange resin bed is made up of an anion exchange resin and the second ion exchange resin bed is made up of a cation exchange resin.

9. Apparatus for chromatographic quantitative analysis of a plurality of ionic species in a solution, each of a common valence sign, said sign being one of positive or negative, which comprises:
a generally cylindrical chromatographic column adapted to hold two ion exchange beds, one above the other, said column being provided at about mid-height with a liquid transmitting distributor element supported by the column wall and extending transversely across the width of the column, said column having a valve controlled port adjacent said distributor element, and means for admitting to the top of the column each of said solution to be analyzed and developing reagent;
a common quantitative detection means adapted to detect and react quantitatively to the members of said ionic species on their being eluted in solution from said chromatographic column and fed to said detection means along with preselected solution of developing reagent, said reaction of the detection means being an electrical signal;
A readout means electrically connected to and adapted to receive the electrical signal from said detection means and to convert said electrical signal to a visible signal; and
liquid conduit means for conveying said solution of ionic species from the column to said detection means.

10. The apparatus as in claim 9 wherein the detection means is a conductivity cell.

11. The apparatus as in claim 9 wherein the column is charged with two ion exchange resins in juxtaposed beds, the upper bed being of an ion exchange resin adapted to resolve the members of said ionic species, to be determined, on being eluted therefrom with a dissolved developing reagent and the lower bed being of an ion exchange resin adapted to prevent the developing reagent in said solution from passing out of the column in highly ionized form while passing the resolved members of said ionic species in substantially ionic form and substantially without interfering with said resolution, said resin in the lower bed having an ion exchange capacity at least 20 times the ion exchange capacity of the resin in the upper bed.

12. The apparatus as in claim 11 wherein the upper bed is of a resin with surface accessible ion exchange sites, and exhibiting a specific ion exchange capacity in the range of about 0.005 to 0.1 milliequivalents per gram of resin.

13. Apparatus for the chromatographic quantitative analysis of a plurality of ionic species each of a common valence sign, said sign being one of positive or negative, said species being in solution, which comprises:
first and second chromatographic columns connected in series by a liquid conduit;
a conductivity cell adapted to detect and react quantitatively to the said ionic species on being eluted in solution from said second chromatographic column and fed to said conductivity cell, said reaction of the conductivity cell being an electrical signal;
a readout means electrically connected to and adapted to receive the electrical signal from said conductivity cell and to convert said electrical signal to a visible signal proportional to the amount of the ionic species in the solution being analyzed;
liquid conduit means for conveying each of the solution of ionic species and solution of developing reagent to said first chromatographic column and for conveying effluent from said second chromatographic column to said conductivity cell; and means for introducing each of plurality of ionic species in solution and solution of developing reagent into said liquid conduit means.

14. The apparatus as in claim 13 wherein both said first and second chromatographic columns have approximately the same length and width dimensions.

15. The apparatus as in claim 13 wherein the readout means is a recorder-integrator electrically connected to a conductivity meter which is in turn electrically connected to the electrodes of said conductivity cell.

16. The apparatus as in claim 13 wherein the first ion exchange column is charged with an ion exchange resin adapted to resolve the members of said ionic species on being eluted therefrom with a solution of developing reagent and the second ion exchange column is charged with an ion exchange resin adapted to prevent the developing reagent from reaching the conductivity cell in highly ionized form while passing the resolved members of said ionic species substantially without interfering with said resolution.

17. The apparatus as in claim 16 wherein the first chromatographic column is charged with a high performance, low capacity ion exchange resin.

18. The apparatus as in claim 16 wherein the second chromatographic column is charged with a high capacity ion exchange resin having an ion exchange capacity at least 20 times the ion exchange capacity of the resin in the first chromatographic column.

19. The apparatus as in claim 18 wherein the ion exchange capacity of the resin in the second column is at least 200 times the ion exchange capacity of the resin in the first chromatographic column.

20. The apparatus as in claim 16 wherein the first chromatographic column contains a cation exchange resin and the second chromatographic column contains an anion exchange resin.

21. The apparatus as in claim 16 wherein the first chromatographic column contains an anion exchange resin and the second chromatographic column contains a cation exchange resin.

22. Apparatus for chromatographic quantitative analysis of a plurality of ionic species each of a common valence sign, said sign being one of positive or negative, and said ionic species being in solution, which comprises:
a first chromatographic column and a plurality of respective second chromatographic columns;
a common detection means adapted to detect and react quantitatively to the said ionic species on their being eluted from any of said plurality of second chromatographic columns to said detection means, said reaction of the detection means being an electrical signal;
a readout means electrically connected to and adapted to receive the electrical signal from said detection means and to convert said electrical signal to a visible signal;
liquid conduit and header and valving means for conveying liquid from the first chromatographic column in turn to any preselected second chromatographic column and liquid conduit and header and valving means for conveying liquid effluent from any preselected second chromatographic column to said detection means;
liquid conduit means for conveying each of said solution of ionic species and preselected developing reagent solution to first chromatographic column; and means for introducing each of plurality of ionic species in solution and solution of developing reagent into said liquid conduit means.

23. The apparatus as in claim 22 in which the detection means is a conductivity cell.

24. The apparatus as in claim 22 which comprises, in addition:
a plurality of developing reagent reservoirs, a pump, a selection valve, a sample injection valve and liquid conduit means for bringing developing reagent solution from any of said reservoirs to the selection valve, the pump and the sample injection valve and thence to the first chromatographic column.

25. Apparatus for chromatographic quantitative analysis of a plurality of ionic species each of a common valence sign, said sign being one of positive or negative and said ionic species being in solution, which comprises:
at least one first chromatographic column and at least one second chromatographic column, each said at least one first chromatographic column being piped to be utilized in parallel and alternatively, and each said at least one second chromatographic column being piped to be utilized in a parallel and alternatively, the effluent from a preselected at least one first chromatographic column being connected by piping and valving means for conveying such effluent to any preselected at least one second chromatographic column,
means for adding said plurality of ionic species in solution to the first ion exchange resin bed means;
means for adding solution of developing reagent to the first ion exchange resin bed means;
a common detection means adapted to detect and react quantitatively to the said ionic species on being eluted from said at least one second chromatographic column, said reaction of the detection means being an electric signal,
and piping means for conveying effluent from the terminal used at least one second chromatographic column to said detection means.

26. The apparatus as in claim 25 in which the detection means is a conductivity cell.

27. The apparatus as in claim 25 having a plurality of at least one first chromatographic column piped to be used in parallel and alternatively.

28. The apparatus as in claim 25 having a plurality of at least one second chromatographic column piped to be used in parallel and alternatively.

29. The apparatus as in claim 25 having two second chromatographic columns.

30. Method of chromatographic quantitative analysis of a plurality of ionic species in a solution, each species being of a common valence sign, said sign being one of positive or negative, which comprises:
adding said solution to first ion exchange resin bed means and separating said plurality of ionic species on eluting said ion species from said first resin bed with a solution of developing reagent, the ion exchange resin and the developing reagent being preselected to cooperatively facilitate chromatographic ion species separation;
passing the effluent from the first ion exchange resin bed means through a second ion exchange resin bed means, containing ion exchange resin of a preselected nature, geometric configuration and amount to effectively convert all of said developing reagent to weakly ionized form substantially without destroying the said separation;

and quantitatively detecting each separated ionic species exiting from said second ion exchange resin bed means.

31. The method as in claim 30 in which the first ion exchange resin is a resin having a specific ion exchange capacity in the range of about 0.005 to 0.1 milliequivalents per gram of resin.

32. The method as in claim 30 in which the second ion exchange resin bed has at least 20 times the total exchange capacity of the first ion exchange resin.

33. The method as in claim 30 in which the second ion exchange resin bed has at least 200 times the total exchange capacity of the first ion exchange resin.

34. The method as in claim 30 in which the developing reagent utilized has an affinity for the first ion exchange resin from about 0.1 to 10 times that of the most tightly bound of the ionic species being quantitatively analyzed.

35. The method as in claim 30 in which the ionic species are cations, the resin in the first ion exchange resin bed means is a cation exchange resin and the resin in the second ion exchange resin bed means is an anion exchange resin.

36. The method as in claim 30 in which the ionic species are selected from cations of alkali metals and ammonium and organic cations which form soluble hydroxides and the developing reagent is selected from strong mineral acid and the resin in the second ion exchange resin bed is in the hydroxide form.

37. The method as in claim 30 in which the ionic species are cations of compounds selected from protonated amine and quaternary ammonium halides, the developing reagent is hydrochloric acid and the resin in the second resin bed is in the hydroxide or basic form.

38. The method as in claim 30 in which the ionic species are cations of compounds selected from protonated amine and quaternary ammonium chloride, the developing reagent is selected from weak base amine hydrohalide salts, and the resin in the second resin bed is in the hydroxide form.

39. The method as in claim 30 in which the ionic species are cations of alkali metals, the developing reagent is HCl, and the resin in the second ion exchange resin bed is in the hydroxide form.

40. The method as in claim 30 in which the ionic species are anions, the resin in the first ion exchange resin bed means is an anion exchange resin and the resin in the second ion exchange resin bed means is a cation exchange resin.

41. The method as in claim 40 in which the ionic species are anions of highly dissociated acids, the developing reagent is sodium hydroxide or potassium hydroxide and the resin in the second ion exchange resin bed means is a cation exchange resin in the hydrogen ion form.

42. The method as in claim 40 in which the ionic species are selected from the group consisting of $Cl^-$, $Br^-$, $PO_4^{---}$, $NO_3^-$ and $SO_4^{--}$.

43. The method as in claim 40 in which the anions are selected from the group consisting of $SO_4^{--}$, $PO_4^{---}$, and, organic anions that are tightly bound by the anion exchange resin but do not form insoluble or weakly dissociated acids, the developing reagent is sodium phenate, and the cation resin in the second ion exchange resin bed means is in the hydrogen ion form.

44. The method as in claim 30 in which the separated ionic species exiting from the second ion exchange resin bed means is detected with a conductivity cell which produces an electrical signal proportional to the amount of ionic species present in the cell.

45. The method as in claim 44 in which the said electrical signal is directed to readout means producing a visible signal.

46. The method as in claim 45 in which the readout means utilized is an integrator-recorder.

47. The method of claim 30 in which the ionic species being analyzed are ions of amines including the additional initial step of preparing such ionic species from covalent organic compounds.

48. The method of chromatographic quantitative analysis of a plurality of ionic species, each species being of a common valence sign, said sign being one of positive or negative and the ionic species being in solution, which comprises:

conveying said solution of ionic species onto and through a first chromatographic column concurrently with a continuous stream of a solution of developing reagent, said developing reagent being an ionized material, said column being charged with an ion exchange resin in a form and adapted to substantially resolve said members of said species on elution from such first column with said developing reagent solution;

by means of said stream of developing reagent solution, conveying said substantially resolved ionic species through liquid conduit means to a second chromatographic column, said second column being charged with an ion exchange resin adapted to prevent the developing reagent from said developing reagent solution from leaving said second column in highly ionized form and said resolved species being passed from said second column with the resolution thereof substantially undiminished;

conveying the solution of said resolved species substantially free of highly ionized developing reagent by liquid conduit means to and through a conductivity cell;

and quantitatively detecting fluctuating changes in conductivity of said solution of resolved species flowing through said conductivity cell;

said second chromatographic column having at least sufficient ion exchange capacity to prevent the developing reagent needed to resolve and move the ionic species off the first column from leaving the second column in highly ionized form.

49. The method as in claim 48 wherein the detected fluctuation changes are quantified and recorded.

50. The method as in claim 48 wherein the ionic species are cations.

51. The method as in claim 48 wherein the ionic species are anions.

52. The method as in claim 48 wherein the ion exchange capacity of the ion exchange resin in the second chromatographic column is at least 200 times the ion exchange capacity of the first chromatographic column.

53. The method as in claim 48 wherein the second chromatographic column strips developing reagent from the solution thereof by absorption at ion exchange sites.

54. The method as in claim 48 wherein the second chromatographic column converts ionic developing reagent into weakly ionized molecular form.

55. The method as in claim 48 wherein the resin in the first chromatographic column is a high performance, substantially non-porous ion exchange resin with a specific exchange capacity in the range of about 0.005 to 0.1 milliequivalents per gram of resin.

56. The method as in claim 48 wherein the ionic species being separated and quantified are cations and the ion exchange resin in the first chromatographic column is a surface sulfonated styrene-divinyl benzene resin.

57. The method as in claim 48 wherein the ionic species being separated and quantified are anions and the ion exchange resin in the first chromatographic column is a furface sulfonated styrene-divinyl benzene resin having deposited on the surface thereof fine particles of a strong base anion exchanger resin, the particles being finer than about 2 microns longest dimension.

58. The method as in claim 48 wherein the developing reagent solution and ion species solution are each aqueous solutions.

* * * * *